US012235188B2

(12) United States Patent
Yao et al.

(10) Patent No.: US 12,235,188 B2
(45) Date of Patent: Feb. 25, 2025

(54) PIPELINE POTENTIAL SAFETY HAZARD INTELLIGENT IDENTIFICATION SYSTEM AND METHOD INTEGRATING POWER FREQUENCIES, PRESSURES AND TEMPERATURES

(71) Applicant: CHINA CONSTRUCTION INDUSTRIAL & ENERGY ENGINEERING GROUP CO., LTD., Nanjing (CN)

(72) Inventors: Shengqing Yao, Nanjing (CN); Ziyao Sun, Nanjing (CN); Jiaojiao Ni, Nanjing (CN); Longkang Xiang, Nanjing (CN); Zengxiao Gao, Nanjing (CN); Sicong Chen, Nanjing (CN); Linjie Cui, Nanjing (CN)

(73) Assignee: CHINA CONSTRUCTION INDUSTRIAL & ENERGY ENGINEERING GROUP CO., LTD., Nanjing (CN)

( * ) Notice: Subject to any disclaimer, the term of this patent is extended or adjusted under 35 U.S.C. 154(b) by 0 days.

(21) Appl. No.: 18/731,114

(22) Filed: May 31, 2024

(65) Prior Publication Data
US 2025/0020532 A1    Jan. 16, 2025

(30) Foreign Application Priority Data

Jul. 10, 2023   (CN) .......................... 202310838018.8

(51) Int. Cl.
*G01M 3/00*        (2006.01)
*G01M 3/28*        (2006.01)
(52) U.S. Cl.
CPC .......... *G01M 3/002* (2013.01); *G01M 3/2815* (2013.01)

(58) Field of Classification Search
CPC .... G01M 3/00; G01M 3/002; G01M 3/16–18; G01M 3/26–28; G01M 3/2815
See application file for complete search history.

(56) References Cited

U.S. PATENT DOCUMENTS

2016/0238181 A1    8/2016    Suzuta et al.

FOREIGN PATENT DOCUMENTS

CA      2342655 A1     9/2021
CN    101761780 A     6/2010
(Continued)

OTHER PUBLICATIONS

Machine translation of JP-2014203166-A (Year: 2014).*
(Continued)

*Primary Examiner* — Nguyen Q. Ha
(74) *Attorney, Agent, or Firm* — SZDC Law PC

(57) ABSTRACT

The present invention provides a pipeline potential safety hazard intelligent identification system and method integrating power frequencies, pressures and temperatures and belongs to the technical field of intelligent monitoring. A monitoring system includes temperature sensors, pressure sensors, an Internet of Things (IoT) electricity meter, a PLC, an IoT DTU and a remote server. The present invention has the advantages of reading and analyzing pipeline operating state parameters in real time via digital sensors, and realizing remote real-time monitoring by uploading data via the IoT DTU; acquiring a leakage transient temperature by performing energy analysis on fluid at a leakage location of a pipeline, deducing a variation of pressure gradients from a variation of temperature gradients, performing two-parameter linkage leakage analysis, and positioning a leakage point with higher accuracy; and realizing the control logic through the PLC, and being easy to operate and high in applicability. The present invention further has the advan- (Continued)

tages of forming a pressure-temperature dataset and a power frequency dataset, analyzing an operating state of a heating pipeline in real time, integrally setting a leakage threshold value in conjunction with a variation of device power frequencies and reducing false alarm frequencies.

5 Claims, 3 Drawing Sheets

(56) References Cited

FOREIGN PATENT DOCUMENTS

| CN | 102563362 A | 7/2012 |
| CN | 102865459 A | 1/2013 |
| CN | 104122051 A | 10/2014 |
| CN | 104535281 A | 4/2015 |
| CN | 106567997 A | 4/2017 |
| CN | 106838627 A | 6/2017 |
| CN | 106895269 A | 6/2017 |
| CN | 107771276 A | 3/2018 |
| CN | 108870091 A | 11/2018 |
| CN | 109357169 A | 2/2019 |
| CN | 110513603 A | 11/2019 |
| CN | 110926731 A | 3/2020 |
| CN | 211178897 U | 8/2020 |
| CN | 113173803 A | 7/2021 |
| CN | 213900752 U | 8/2021 |
| CN | 113944891 A | 1/2022 |
| CN | 113963514 A | 1/2022 |
| CN | 114485455 A | 5/2022 |
| CN | 217559935 A | 10/2022 |
| FR | 2294439 A1 | 7/1976 |
| JP | 2014203166 A * | 10/2014 ........... G05B 23/024 |
| WO | 2021027803 A1 | 2/2021 |

OTHER PUBLICATIONS

Tang Xiujia, "Non-isothermal Long Pipelines Leak Detection and Location" Act a Scientiar um Nat ur alium Universit atis Pekinensis, vol. 33, No. 5 ( Sep. 1997), pp. 574-580.

Yanlong Cao et al., "Numerical Simulation of the Pressure Gradient Method to Position Pipeline Leak" Journal o Liaoning Shihua University, vol. 34, No. 2, Apr. 2014, pp. 45-48.

Jinxiang Wu et al., "Leakage detection method of buried heating pipelines based on soil temperature and humidity" HV&AC No. 48, No. 9, 2018, pp. 58-62.

Ziyao Sun et al., "Construction site power information management system based on DTU and PLC" Technology Exchange, No. 10, 2022, pp. 80-83.

* cited by examiner

PIPELINE POTENTIAL SAFETY HAZARD INTELLIGENT IDENTIFICATION SYSTEM AND METHOD INTEGRATING POWER FREQUENCIES, PRESSURES AND TEMPERATURES

TECHNICAL FIELD

The present invention belongs to the technical field of intelligent monitoring, and particularly relates to a heating pipeline operating state monitoring system and method integrating pressure sensing and temperature sensing.

BACKGROUND

A heating pipeline is a bridge to connect a heat source with heat consumers. As the scale of an urban heating pipeline network is growing, the failure probability of heating pipelines has increased. Pipeline leakage is the most common form of failure. Pipeline leakage causes energy waste and economic losses easily and also brings a potential danger of safety accidents to inspection personnel, thus, it is crucial to monitor the operating state of the heating pipelines in real time. Traditional pipeline leakage monitoring includes a negative-pressure wave detection method, a distributed optical fiber method, a flow balancing method, a wavelet analysis method, etc., through hardware and software, the extraction and analysis of pipeline operating parameters are realized, and a certain positioning precision and leakage prediction precision are provided. However, the above methods mostly stay in the theory, simulation and laboratory stages, and in practical engineering, the cost of arranging various sensing devices along a pipeline is high, and the field applicability is low. Therefore, the present invention designs a heating pipeline operating state monitoring system and method integrating pressure sensing and temperature sensing. By integrating on-site pressure sensing and temperature sensing, operating state monitoring on the heating pipelines and pipeline leakage analysis and early warning are realized without adding sensing devices.

SUMMARY

In view of the disadvantages in the prior art, the present invention provides a heating pipeline operating state monitoring system and method integrating pressure sensing and temperature sensing, which solve the problems of high economical costs and low field applicability of traditional pipeline leakage monitoring.

The present invention achieves the described technical object by the following technical means.

Provided is a monitoring method for a heating pipeline operating state monitoring system based on integrating pressure sensing and temperature sensing. The monitoring system comprises temperature sensors, pressure sensors, an Internet of Things (IoT) electricity meter, a PLC, an IoT DTU, a communication cable and a remote server; the pressure sensors and the temperature sensors are arranged on a heating pipeline; the IoT electricity meter is located in a device pump unit distribution box at the starting end of the heating pipeline and collects a frequency variation of a heating supply pump in real time; the PLC communicates with the temperature sensors, the pressure sensors, the IoT electricity meter and the IoT DTU, receives temperature values, pressure values and frequency values collected in real time, performs operation analysis, outputs early warning signals and positions a leakage point; and the IoT DTU is in signal connection with the remote server via a mobile network, and the remote server processes and stores all data of the monitoring system.

The monitoring method comprises the following steps:
step 1, dividing leakage analysis units according to the conditions of the temperature sensors and the pressure sensors arranged on the heating pipeline;
step 2, receiving, by the PLC, temperature values and pressure values collected by the temperature sensors and the pressure sensors in real time, performing early-stage theoretical analysis on energy at a leakage point; then analyzing and solving a pipeline leakage transient steam temperature and a pipeline leakage transient pressure;
step 3, based on the transient temperature and the transient pressure, positioning a leakage location by the PLC according to a pressure gradient method; and
step 4, performing, by the PLC, a pipeline leakage early warning and an on-off early warning of a heating supply pump unit.

Further, in step 1, on the heating pipeline, a temperature sensor is arranged within a certain distance downstream of the pressure sensor, and three temperature sensors and two pressure sensors are selected to form a leakage analysis unit.

Further, in step 2, the process of analyzing and solving a pipeline leakage transient steam temperature and a pipeline leakage transient pressure by the PLC is specifically as follows:
at the moment of pipeline leakage, $T_o^N = T_o^L = T_o$, wherein $T_o^N$ is a temperature of an outer wall of the pipeline in the case of no leakage; $T_o^L$ is a temperature of the outer wall of the pipeline in the case of leakage; and $T_o$ is a transient temperature of the outer wall of the pipeline; the pipeline leakage transient steam temperature $T_m$ is calculated by a formula below:

$$T_m = T_i - \frac{h(T_i - T_o)}{c_p \rho \delta}$$

wherein, $T_i$ is a temperature of fluid in the pipeline; h is a convection heat transfer coefficient of steam in the pipeline and a thermal insulation layer; $c_p$ is a specific heat capacity of steam; $\rho$ is a steam density; and $\delta$ is a wall thickness of the pipeline;
a corresponding relationship between a steam pressure and a temperature in the heating pipeline is shown by a formula (7) below:

$$\ln(P) = 9.3876 - \frac{3826.36}{T - 45.47} \tag{7}$$

wherein P is the steam pressure; and T is the steam temperature; and
a value P calculated by substituting $T_m$, as the steam temperature, into the formula (7) is the pipeline leakage transient pressure $P_m$ corresponding to the pipeline leakage transient steam temperature $T_m$.

Further, in step 3, the process of positioning a leakage location by the PLC according to a pressure gradient method is specifically as follows:
firstly, calculating a pressure gradient $$\left.\frac{\partial P}{\partial x}\right|_U$$

upstream of a leakage point and a pressure gradient $$\left.\frac{\partial P}{\partial x}\right|_D$$

downstream of the leakage point:

$$\left.\frac{\partial P}{\partial x}\right|_U = \frac{\dot{P}_1 - P_m}{X} \qquad (8)$$

$$\left.\frac{\partial P}{\partial x}\right|_D = \frac{P_m - \dot{P}_2}{L+s-X} \qquad (9)$$

wherein, L is a distance from a pressure sensor within a region of the leakage point to a temperature sensor downstream thereof, S is a distance from a temperature sensor within the region of the leakage point to a pressure sensor downstream thereof, X is a distance from the location of the leakage point to a pressure sensor within the region of the leakage point; x represents a gradient direction; $\dot{P}_1$ is a pressure value detected by the pressure sensor upstream of the leakage point; $\dot{P}_2$ is a pressure value detected by a pressure sensor downstream of the leakage point; and $P_m$ is the pipeline leakage transient pressure;

it is known from a formula for conservation of momentum within a steam pipeline:

$$\left.\frac{\partial P}{\partial x}\right|_U = -\frac{f\rho u^2}{2D} \qquad (10)$$

$$\left.\frac{\partial P}{\partial x}\right|_D = -\frac{f\rho u^2}{2D}$$

wherein, f is a friction coefficient; u is a flow velocity of steam; ρ is a steam density; and D is a pipeline diameter;

it can be obtained from simultaneous equations (8)-(10) that:

$$X = \frac{(L+s)(\dot{P}_1 - P_m)}{\dot{P}_1 - \dot{P}_2}$$

since the arrangement locations of the sensors are known, the location of the leakage point can be determined accurately according to the calculated value X.

Further, in step 3, in the process of positioning the location of the leakage point, a correction coefficient ξ is introduced, and the value X is corrected by a method of using temperatures to correct pressures, wherein the correction coefficient is represented by a formula below:

$$\xi = \frac{2T_m}{\dot{T}_1 + \dot{T}_2}$$

a corrected new value X is:

$$X = \frac{(L+s)(\dot{P}_1 - P_m)}{\dot{P}_1 - \dot{P}_2} \cdot \xi$$

wherein, $T_m$ is the pipeline leakage transient steam temperature; $\dot{T}_1$ is a temperature value detected by the temperature sensor upstream of the leakage point; and $\dot{T}_2$ is a temperature value detected by the temperature sensor downstream of the leakage point.

Further, in step 4, the process of performing, by the PLC, a pipeline leakage early warning and an on-off early warning of a heating supply pump unit is specifically as follows:

the PLC collects data from the pressure sensors and the temperature sensors to form a pressure dataset and a temperature dataset for representing a pressure value distribution and a temperature value distribution along the pipeline at the same moment; sampling periods are set, so that the pressure value distribution of the same pressure sensor and the temperature value distribution of the same temperature sensor at intervals of one sampling period are formed; and at the same time, the PLC collects power frequencies of a heating supply pump through the IoT electricity meter to form a frequency dataset;

when any frequency value in the frequency dataset satisfies an on-off condition, which indicates that an on-off event occurs to the heating supply pump, the PLC outputs a device on-off signal to a device state register inside the PLC, but does not drive a field buzzer;

when a pressure leakage threshold value ξ(P) preset by the PLC satisfies an early warning condition, the PLC outputs a pressure early warning signal to a pressure state register inside the PLC, if the monitoring system triggers the device on-off signal at the moment, the PLC automatically identifies a current working condition as a device on-off condition and no leakage; and if the monitoring system does not trigger the device on-off signal at the moment, the PLC drives the buzzer to give a leakage alarm and then positions the leakage location according to the method described in step 3.

Further, the early warning condition is $$\varepsilon(P) \geq 0.9 \left|\frac{P_i - P_m}{P_i}\right|,$$

wherein $$\varepsilon(P) = \left|\frac{P_i - P_i^{\Delta t}}{P_i}\right|, P_m$$

is the pipeline leakage transient pressure, $P_i^{\Delta t}$ represents a pressure value collected by the pressure sensor i at intervals of one sampling period Δt, and $P_i$ represents a pressure value detected by the pressure sensor i.

Further, the on-off condition is that the frequency value is greater than 52 h or less than 48 h.

The present invention has the following beneficial effects:

(1) changing a conventional method for monitoring a heating pipeline using pointer-type pressure meters and thermometers, reading, analyzing and recording pipeline operating parameters by digital pressure sensors and digital temperature sensors in real time, uploading data via an IoT DTU to implement real-time remote monitoring, and querying cloud data in real time;

(2) performing energy analysis on fluid at the leakage location of the pipeline to obtain the leakage transient temperature, taking a temperature variation as guidance for solving the pressure gradient, positioning the leakage point of the heating pipeline, improving positioning accuracy, performing logical operation via the PLC by the algorithm, finding the leakage in time and outputting early warning signals;

(3) forming the pressure-temperature dataset and the power frequency dataset, analyzing the operating state of the heating pipeline in real time, integrally setting the leakage threshold value in conjunction with a variation of device power frequencies and reducing false alarm frequencies;

(4) deducing the variation of the pressure gradients from the variation of temperature gradients, performing two-parameter linkage leakage analysis, and improving leakage positioning accuracy; and (5) realizing the control logic through the PLC, and being easy to operate and high in applicability.

As shown in the figure: 1—temperature sensor A; 2—pressure sensor A; 3—temperature sensor B; 4—pressure sensor B; 5—temperature sensor C; 6—thermal insulation layer; 7—pipe wall.

DETAILED DESCRIPTION OF EMBODIMENTS

The present invention is further described below with reference to the accompanying drawings and specific embodiments, but the scope of protection of the present invention is not limited thereto. Mediums in a heating pipeline may be water, steam or a gas-liquid two-phase. Operating state monitoring schemes for the mediums are the same. The scheme of the present invention is described by preferably taking the heating pipeline using steam as the medium as an example.

Figure 1:
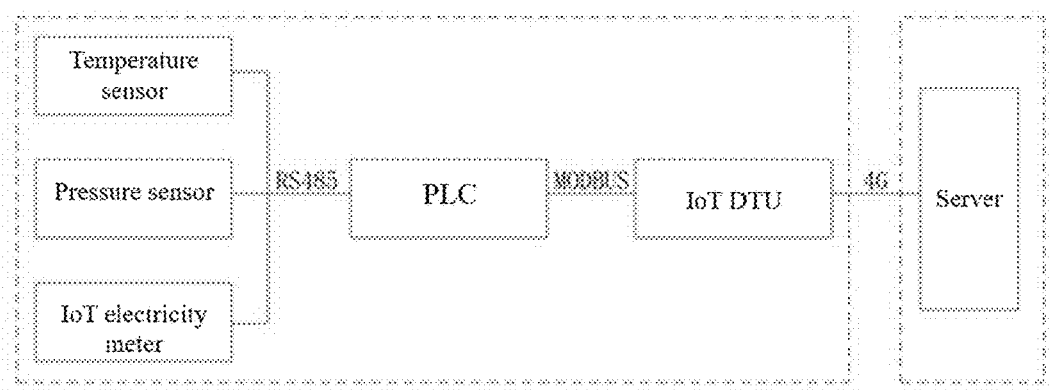
FIG. 1 is a frame diagram of a monitoring system according to the present invention.

With reference to FIG. 1, a heating pipeline operating state monitoring system integrating pressure sensing and temperature sensing in the present invention includes temperature sensors, pressure sensors, an Internet of Things (IoT) electricity meter, a PLC, an IoT DTU, a communication cable and a remote server.

The pressure sensors and the temperature sensors are arranged on a heating pipeline. Without changing the arrangement number and distance in an original heating pipeline instrument construction drawing, digital sensors with a communication function are adopted as substitutes, facilitating the real-time acquisition of system data; and the IoT electricity meter is located in a device pump distribution box at the starting end of the heating pipeline, and the IoT electricity meter with a communication function is used for collecting a frequency variation of a heating supply pump in real time.

The PLC, as a core control component of the monitoring system, includes a PLC body, an extended communication module I and an extended communication module II; the extended communication module I communicates with the temperature sensors and the pressure sensors via RS485 and is responsible for receiving temperature values and pressure values collected by the sensors in real time; the extended communication module II communicates with the IoT DTU via a MODBUS protocol and is responsible for uploading processed data; and the PLC body is responsible for storing data collected by the extended communication module I, performing operation and analysis on the data according to an established logical program and outputting early warning signals.

After completing communication with the PLC, the IoT DTU uploads the processed data to the remote server via a 4G mobile network, and all the data of the monitoring system are processed and stored by the remote server.

The remote server is built based on an MQTT protocol, receives the data uploaded by the IoT DTU and data uploaded by the IoT electricity meter and can integrally display pressure parameters, temperature parameters and early warning signals of the heating pipeline via cloud platforms such as a self-developed platform or Alibaba Cloud.

The IoT DTU, the temperature sensors and the pressure sensors are powered by a 24V power supply. An output port of the PLC is connected to a relay KA1. After the PLC outputs an early warning signal, the relay KA1 drives a buzzer to send out an early warning for field leakage.

Figure 2:
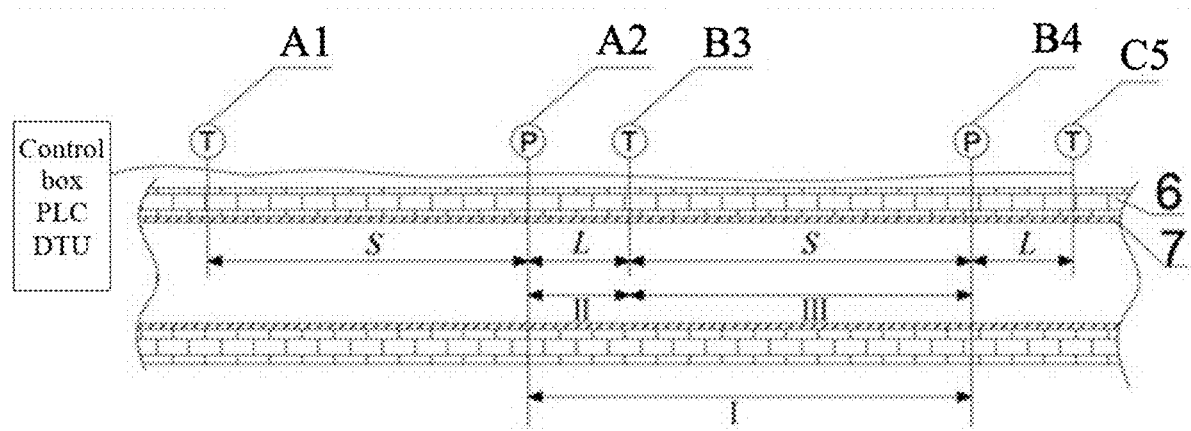
FIG. 2 is a schematic diagram of a leakage analysis unit.
Figure 5:
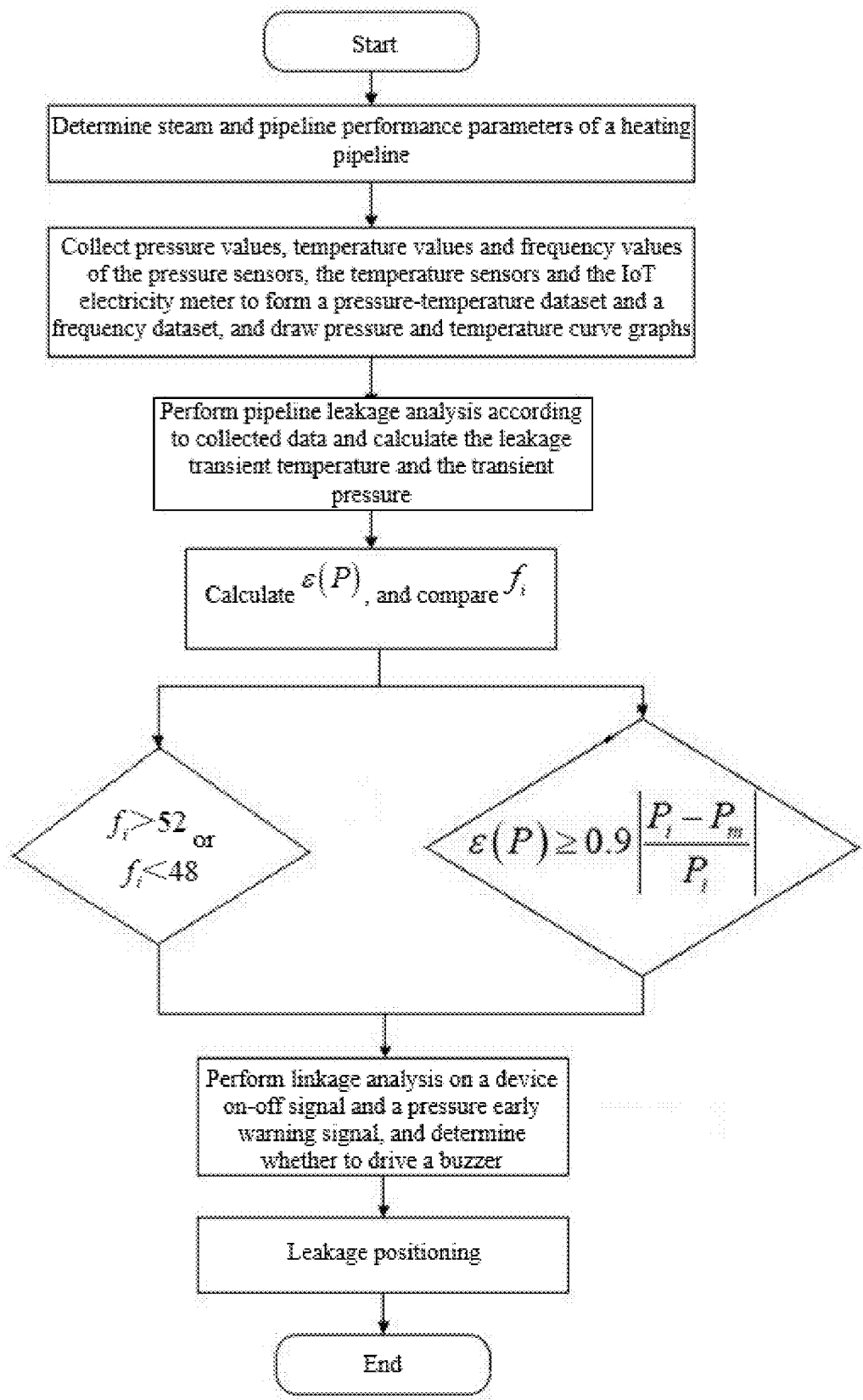
FIG. 5 is a flow diagram of a heating pipeline operating state monitoring method according to the present invention.

A heating pipeline operating state monitoring method using the heating pipeline operating state monitoring system integrating pressure sensing and temperature sensing, as shown in FIG. 5, includes the following steps:

Step 1, dividing leakage analysis units;

since the heating pipeline is long, a temperature sensor is arranged within a certain distance downstream of the pressure sensor according to a common construction method, and the heating pipeline needs a unit division to facilitate monitoring analysis. Referring to FIG. 2, three temperature sensors and two pressure sensors are selected as a leakage analysis unit;

in each leakage analysis unit, a leakage zone is marked as a zone I, and the zone I includes a zone II and a zone III. When leakage occurs in the zone II, data sources for analysis come from temperature values of a temperature sensor A1 and a temperature sensor B3 and pressure values of a pressure sensor A2 and a pressure sensor B4; and when leakage occurs in the zone III, data sources for analysis come from temperature values of the temperature sensor B3 and a temperature sensor C5 and pressure values of the pressure sensor A2 and the pressure sensor B4.

Step 2, receiving, by the PLC, temperature values and pressure values collected by the temperature sensors and the pressure sensors in real time, and performing early-stage theoretical analysis on energy at a leakage point;

in the case of no pipeline leakage, the heat of steam in the pipeline not only is transported to an end heat consumer but also has a convective heat exchange with the pipe wall 7; and in a long-distance heating pipeline, a heat exchange capacity of the heat consumer can be obtained by a pipe network heat transport formula, that is $$Q_u = c_p \cdot G \cdot (T_g - T_h)$$

wherein $Q_u$ is a heat exchange capacity of a heat consumer side, and the unit is kW; G is the amount of heating steam, and the unit is t/h; $c_p$ is a specific heat capacity of steam, and the unit is J/(kg·°C.); $T_g$ is a steam supply temperature at the heat consumer side, and the unit is °C.; and $T_h$ is a steam backflow temperature at the heat consumer side, and the unit is °C.

Therefore, in the case of no pipeline leakage, the variation of a steam heat capacity in the pipeline is:

$$\Delta Q^N = Q - Q_h - Q_u$$

wherein $\Delta Q^N$ is the variation of a steam heat capacity in the pipeline in the case of no pipeline leakage, and the unit is kW; Q is a heat capacity of heating steam, and the unit is kW; and $Q_h$ is a capacity of convective heat exchange between steam and the pipe wall 7, and the unit is kW.

Figure 3:
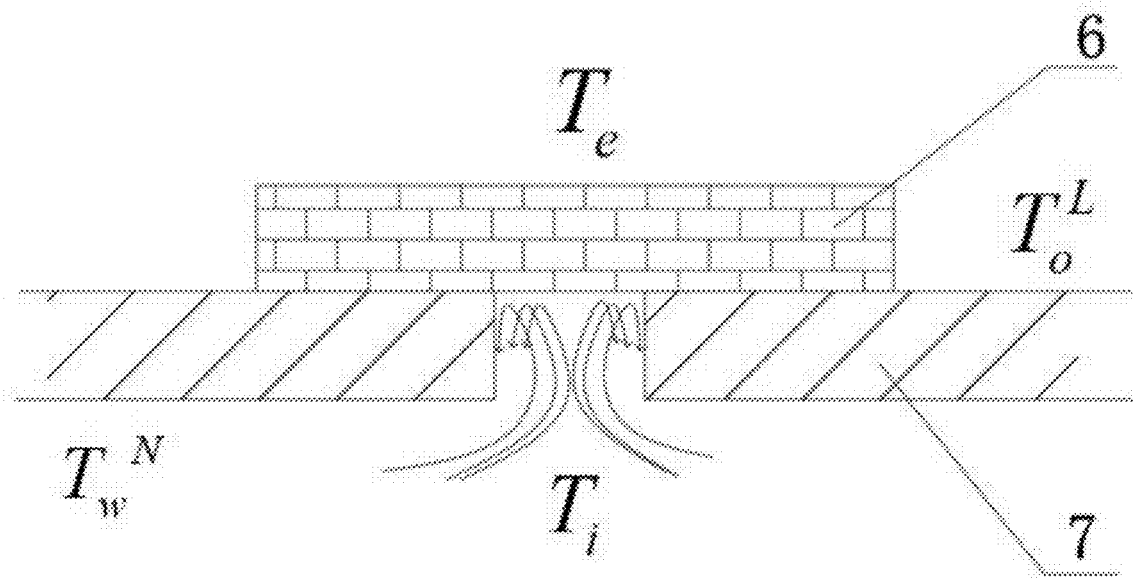
FIG. 3 is a diagram of a two-dimensional model of a leakage hole.

In the case of pipeline leakage, steam in the pipeline directly contacts the thermal insulation layer 6 along a leakage hole. The heat transfer process includes convective heat exchange between fluid in the pipeline and the wall of the leakage hole, convective heat exchange between the fluid in the pipeline and the thermal insulation layer 6 and heat conduction between an inner surface of the thermal insulation layer 6 and an outer surface of the thermal insulation layer 6. Due to the existence of the thermal insulation layer 6 at the leakage hole, part of leakage steam cannot flow out freely and forms a backflow within a short time, and thus, as shown in FIG. 3, the variation of the steam heat capacity at the leakage hole may be equivalent to the convective heat exchange between the fluid in the pipeline, the pipe wall 7 and the thermal insulation layer 6, that is $$\Delta Q^L = Q - Q_h - Q_t - Q_u$$

wherein $\Delta Q^L$ is the variation of the steam heat capacity in the pipeline in the case of pipeline leakage, and the unit is kW; and $Q_t$ is the capacity of convective heat exchange between steam and the thermal insulation layer 6, and the unit is kW.

By comparing the variation of the steam heat capacity in the case of pipeline leakage with the variation of the steam heat capacity in the case of no leakage, there is only the capacity of convective heat exchange between the steam and the thermal insulation layer 6 $Q_t$, namely the variation of a transient heat capacity in the case of steam leakage $\Delta Q = Q_t$; therefore, $$\Delta Q = Q_t = h \cdot (T_i - T_o^L) A \quad (1)$$

wherein $\Delta Q$ is the variation of the transient heat capacity in the case of leakage, and the unit is W; A is the area of the leakage point, and the unit is m²; $T_i$ is a temperature of the fluid in the pipeline, the unit is K, and the temperature of the fluid can be obtained by reading an average temperature value from two adjacent temperature sensors upstream and downstream of the fluid; $T_o^L$ is a temperature of an outer wall of the pipeline, and the unit is K; and h is a convection heat transfer coefficient of the steam in the pipeline and the thermal insulation layer 6, and the unit is W/(m²·K).

In the case of no pipeline leakage, a fluid gap between the outer wall of the pipeline and the inner surface of the thermal insulation layer 6 can be ignored since the thermal insulation layer 6 outside the pipeline is wrapped tightly, the temperature of the outer wall of the pipeline is approximately equal to the temperature of the inner surface of the thermal insulation layer 6, and by analyzing radial heat transfer of the pipeline, the temperature of the outer wall of the pipeline can be obtained in the case of no leakage $T_o^N$:

$$\Phi_h = h \cdot (T_i - T_w^N) \pi (D - 2\delta) L \quad (2)$$

$$\Phi_c = \frac{T_w^N - T_o^N}{\ln D - \ln(D - 2\delta)} \cdot 2\pi \lambda L \quad (3)$$

$$\Phi_v = \frac{T_o^N - T_e}{\ln(D + 2\delta') - \ln D} \cdot 2\pi \lambda' L \quad (4)$$

wherein $\Phi_h$ is the capacity of convective heat exchange between the fluid and the inner wall of the pipeline, and the unit is W; $\Phi_c$ is the heat capacity of heat conduction between the inner wall of the pipeline and the outer wall of the pipeline, and the unit is W; $\Phi_h$ is the heat capacity of heat conduction between the outer wall of the pipeline and the environment, and the unit is W; h is a convection heat transfer coefficient of steam, and the unit is W/(m²·K); D is a diameter of the pipeline, and the unit is m; δ is a wall thickness of the pipeline, namely a distance by which steam flows out from the inside of the pipeline via the leakage hole to the outer wall of the pipeline in unit time, and the unit is m/s; δ' is the thickness of the thermal insulation layer 6, and the unit is m; L is a length between pipe sections, and the unit is mm; λ is a thermal conduction coefficient of a pipeline material, and the unit is W/(m·K); λ' is a thermal conduction coefficient of a thermal insulation material, and the unit is W/(m·K); $T_w^N$ is the temperature of the inner wall of the pipeline in the case of no leakage, and the unit is K; $T_o^N$ is the temperature of the outer wall of the pipeline in the case of no leakage, and the unit is K; and $T_e$ is the temperature of the outer surface of the thermal insulation layer 6 (an approximation of an environment temperature).

Since a heat flow Φ in each heat transfer process remains unchanged, that is $\Phi_h = \Phi_c = \Phi_v \Phi$, $T_o^N$ can be obtained from simultaneous equations (2)-(4); at the moment of leakage, the temperature of the inner surface of the thermal insulation layer 6 is the temperature of the outer wall of the pipeline without leakage, that is $T_o^N = T_o^L$, and thus, the variation of the transient heat capacity of steam at the moment of leakage can be obtained by substituting $T_o^L$ into the formula (1) ΔQ.

In addition, in the actual situation, the aperture of the leakage hole is smaller than the pipeline diameter, and the variation of a transient heat capacity of steam in a leakage space V(V=δ·A) satisfies:

$$\Delta Q = c_p m \Delta T = c_p \rho (\delta A)(T_i - T_m) \quad (5)$$

wherein $c_p$ is the specific heat capacity of steam, and the unit is J/(kg·K); m is a mass flow of steam, and the unit is kg/s; ΔT is the variation of a temperature at the moment of leakage, and the unit is K; and $T_m$ is a leakage transient temperature, and the unit is K; and ρ is the steam density, and the unit is kg/m³.

further in Step 2, continuously receiving, by the PLC, temperature values and pressure values collected by the temperature sensors and the pressure sensors in real time based on the unit division in step 1 and the theoretical analysis above, analyzing and solving a pipeline leakage transient temperature and a pipeline leakage transient pressure;

As the pressure variation propagates in the pipeline in the form of pressure waves and is greatly affected by noise, environment, etc. and the variation of the temperature in the pipeline is less affected by an external environment, the process of solving the transient pressure by the leakage transient temperature is specifically as follows:

it is known from the analysis in step 2 that at the moment of leakage, $T_o^N = T_o^L = T_o$, wherein $T_o^N$ is a temperature of the outer wall of the pipeline in the case of no leakage, and the unit is K; $T_o^L$ is a temperature of the outer wall of the pipeline in the case of leakage, and the unit is K; and $T_o$ is a transient temperature of the outer wall of the pipeline, and the unit is K;

the pipeline leakage transient steam temperature $T_m$ can be calculated by a formula below in conjunction with the formula (1) and the formula (5):

$$T_m = T_i - \frac{h(T_i - T_o)}{c_p \rho \delta} \quad (6)$$

the temperature of steam in the heating pipeline is generally less than or equal to about 500K, so a corresponding relationship between a saturated steam pressure and a temperature of water can be obtained by an Antoine empirical formula or by looking up a table of steam pressure and temperature enthalpy values:

$$\ln(P) = 9.3876 - \frac{3826.36}{T - 45.47} \quad (7)$$

wherein P is the steam pressure, and the unit is MPa; T is the steam temperature, and the unit is K;

a value P calculated by substituting $T_m$, as the steam temperature, into the formula (7) above is the pipeline leakage transient pressure $P_m$ corresponding to the pipeline leakage transient steam temperature $T_m$.

Figure 4:
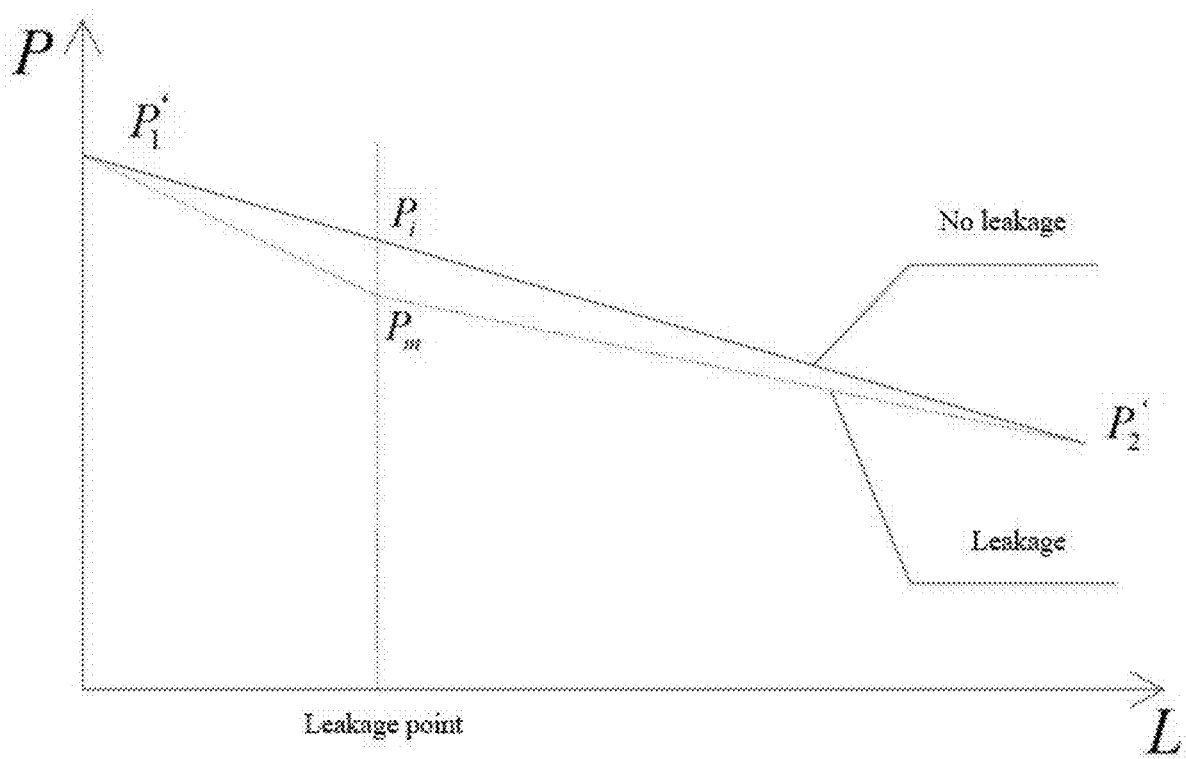
FIG. 4 is a schematic diagram of a pressure gradient at a leakage point.

Step 3, positioning a leakage location by the PLC according to a pressure gradient method, wherein unit zones are divided according to the leakage analysis in step 1, the scheme is described by taking the leakage point located in the zone II as an example in this embodiment, and analysis on other zones is similar;

in the case of leakage, referring to FIG. 4, pressure values of two sides upstream and downstream of the leakage point are the pressure values $\dot{P}_1$ and $\dot{P}_2$ of the pressure sensor A2 and the pressure sensor B4, and a pressure gradient $$\left.\frac{\partial P}{\partial x}\right|_U$$

upstream of the leakage point and a pressure gradient $$\left.\frac{\partial P}{\partial x}\right|_D$$

x downstream of the leakage point are respectively:

$$\left.\frac{\partial P}{\partial x}\right|_U = \frac{\dot{P}_1 - P_m}{X} \quad (8)$$

$$\left.\frac{\partial P}{\partial x}\right|_D = \frac{P_m - \dot{P}_2}{L + s - X} \quad (9)$$

wherein L is a distance between the pressure sensor A2 and the temperature sensor B3, and the unit is m; S is a distance between the temperature sensor B3 and the pressure sensor B4, and the unit is m; X is a distance from the leakage point to the pressure sensor A2, and the unit is m; and X is a gradient direction;

it is known from a formula for conservation of momentum within a steam pipeline:

$$\left.\frac{\partial P}{\partial x}\right|_U = -\frac{f\rho u^2}{2D} \quad (10)$$

$$\left.\frac{\partial P}{\partial x}\right|_D = -\frac{f\rho u^2}{2D}$$

wherein f is a friction coefficient; u is a flow velocity of steam, and the unit is m/s; the aperture of the leakage hole is less than the pipeline diameter and a pipeline length, and a variation of friction coefficients of two adjacent sides of the leakage hole within a short distance are ignored.

in the case of pipeline leakage, no phenomena of obvious free outflow and flow reduction of steam occur because of the presence of the thermal insulation layer 6, and therefore pressure gradients upstream and downstream of the leakage point are approximately the same, and after being stabilized, the pressures restore an original pressure distribution along the pipeline.

it can be obtained from simultaneous equations (8)-(10) that:

$$X = \frac{(L+s)(\dot{P}_1 - P_m)}{\dot{P}_1 - \dot{P}_2} \quad (11)$$

To improve positioning accuracy, a correction coefficient $\xi$ is introduced;

that is, $$X = \frac{(L+s)(\dot{P}_1 - P_m)}{\dot{P}_1 - \dot{P}_2} \cdot \xi$$

Since both the temperature variation and the pressure variation are caused by the same leakage location, by a method of using temperatures to correct pressures in conjunction with a result of numerical simulation, the correction coefficient $\xi$ is expressed by a formula below:

$$\xi = \frac{2T_m}{\dot{T}_1 + \dot{T}_2}$$

wherein $\dot{T}_1$ is a temperature value of the temperature sensor A1 upstream of the leakage point, and the unit is K; and $\dot{T}_2$ is a temperature value of the temperature sensor B3 downstream of the leakage point, and the unit is K.

The location of the leakage point can be positioned accurately according to a calculated value X.

Step 4, performing, by the PLC, a pipeline leakage early warning and an on-off early warning of a heating supply pump unit;

when leakage occurs in the pipeline, a negative pressure at the leakage hole propagates inside the pipeline in the form of pressure waves; because collection analysis of the pressure sensors on the pressure waves are mature, and the variation of the transient temperature at the leakage point can be hardly embodied by data collected by the temperature sensors, a pipeline leakage early warning is realized by setting a pressure threshold value.

When an on-off event happens to the heating supply pump unit at the starting end of the pipeline, a great gradient variation of the pressure in the pipeline may be caused, which can cause a false leakage early warning easily; therefore, the PLC collects data from the pressure sensors and the temperature sensors to form a pressure dataset $(P_1, P_2, P_3, P_4, \ldots P_i, \ldots, P_N)$ and a temperature dataset $(T_1, T_2, T_3, T_4, \ldots T_i, \ldots, T_N)$ for representing a pressure value distribution and a temperature value distribution along the pipeline at the same moment and draws pressure and temperature sensor curve graphs, wherein $P_1$, $P_2$, $P_3$, $P_4$, $P_i$ and $P_N$ respectively represent the pressure values detected by the pressure sensors numbered 1, 2, 3, 4, i and N, and $T_1$, $T_2$, $T_3$, $T_4$, $T_i$, and $T_N$, represent the temperature values detected by the temperature sensors numbered 1, 2, 3, 4, i and N;

Then, a sampling period $\Delta t$ is set (in this embodiment $\Delta t = 1s$), the pressure value distribution $(P_i, P_i^{\Delta t}, P_i^{3\Delta t}, \ldots, P_i^{n\Delta t})$ of the same pressure sensor and the temperature value distribution $(T_i, T_i^{\Delta t}, T_i^{2\Delta t}, T_u^{3\Delta t}, \ldots, T_i^{n\Delta t})$ of the same temperature sensor at intervals of 1 s are formed, wherein n represents a collection frequency, $P_i^{\Delta t}$, $P_i^{2\Delta t}$, $P_i^{3\Delta t}$ and $P_i^{n\Delta t}$ and respectively represent pressure values collected by the pressure sensor numbered at intervals of $\Delta t$, 2 $\Delta t$, 3 $\Delta t$ and n $\Delta t$, and $T_i^{\Delta t}$, $T_i^{2\Delta t}$, $T_i^{3\Delta t}$ and $T_i^{n\Delta t}$ respectively represent temperature values collected by the temperature sensor numbered i at intervals of $\Delta t$, 2 $\Delta t$, 3 $\Delta t$ and n $\Delta t$;

at the same time, the PLC collects power frequencies of the heating supply pump via the IoT electricity meter to form a frequency dataset $(f_1, f_2, f_3, f_4, \ldots f_i, \ldots, f_N)$, and $f_1, f_2, f_3, f_4, f_i$ and $f_N$ respectively represent the 1st, 2nd, 3rd, 4th, i th and N th power frequency values;

when $f_i > 52$ $f_i < 48$ or (this embodiment is described just by taking the pressure sensor and the temperature sensor numbered i, in fact, as long as any value in the frequency dataset meets this condition, it means that an on-off event happens to the heating supply pump), big fluctuations of the power frequencies mean that the on-off event happens to the heating supply pump, and at the moment, the PLC outputs a device on-off signal to a device state register inside the PLC, but does not drive a field buzzer.

A leakage pressure threshold value preset in the PLC is $$\varepsilon(P) = \left| \frac{P_i - P_i^{\Delta t}}{P_i} \right|,$$

and $\xi(P)$ is the leakage pressure threshold value; when $$\varepsilon(P) \geq 0.9 \left| \frac{P_i - P_m}{P_i} \right|,$$

the PLC outputs a pressure early warning signal to a pressure state register inside the PLC, if the system triggers the device on-off signal at the moment, the PLC automatically identifies a current working condition as a device on-off condition and no leakage, and if the system does not trigger the device on-off signal at the moment, the PLC drives the buzzer to give a leakage alarm, then positions the location of the pressure sensor i, and determines a distance from the leakage location, within a range of the distance L+s between the pressure sensor i and the pressure sensor i+1, to the pressure sensor i as X.

The embodiments are preferred embodiments of the present invention, but the present invention is not limited to the above embodiments. Without departing from the essence of the present invention, any obvious improvements, replacements, or modifications that can be made by those skilled in the art should fall within the scope of protection of the present invention.

The invention claimed is:

1. A pipeline potential safety hazard intelligent identification method integrating power frequencies, pressures and temperatures, comprising the following steps:
   step 1, dividing leakage analysis units according to conditions of temperature sensors and pressure sensors arranged on a heating pipeline;
   step 2, receiving, by a PLC, temperature values and pressure values collected by the temperature sensors and the pressure sensors in real time, performing early-stage theoretical analysis on energy at a leakage point; then analyzing and solving a pipeline leakage transient steam temperature and a pipeline leakage transient pressure;
   step 3, based on the transient temperature and the transient pressure, positioning a leakage location by the PLC according to a pressure gradient method; and
   step 4, performing, by the PLC, a pipeline leakage early warning and an on-off early warning of a heating supply pump unit;
   wherein, in step 2, the process of analyzing and solving, by the PLC, a pipeline leakage transient steam temperature and a pipeline leakage transient pressure is specifically as follows:
   at the moment of pipeline leakage, $T_o^N = T_o^L = T_o$, wherein $T_o^N$ is a temperature of an outer wall of a pipeline in the case of no leakage, and the unit is K; $T_o^L$ is a temperature of the outer wall of the pipeline in the case of leakage, and the unit is K; and $T_o$ is a transient temperature of the outer wall of the pipeline, and the unit is K;
   the pipeline leakage transient steam temperature $T_m$ is calculated by a formula below:

$$T_m = T_i - \frac{h(T_i - T_o)}{c_p \rho \delta}$$

wherein, $T_i$ is a temperature of fluid in the pipeline, and the unit is K; h is a convection heat transfer coefficient of steam and a thermal insulation layer (6) in the pipeline, and the unit is W/(m²·K); $c_p$ is a specific heat capacity of steam, and the unit is J/(kg K); $\rho$ is a steam density, and the unit is kg/m³; $\delta$ is a wall thickness of the pipeline, namely a distance by which steam flows out from the inside of the pipeline via a leakage hole to the outer wall of the pipeline in unit time, and the unit is m/s;

$$\delta = \frac{mt}{\rho A},$$

wherein m is a mass flow of steam, namely a fluid mass of the fluid that passes through an effective cross-section of a closed pipeline in unit time, and the unit is kg/s; t is a unit time, namely 1 s; and A is the area of the leakage hole, and the unit is m²;

a corresponding relationship between a steam pressure and a temperature in the heating pipeline is obtained by an Antoine empirical formula or by looking up a table of steam pressure and temperature enthalpy values, as shown in a formula (7) below:

$$\ln(P) = 9.3876 - \frac{3826.36}{T - 45.47} \quad (7)$$

wherein P is the steam pressure, and the unit is MPa; T is the steam temperature, and the unit is K;

a value P calculated by substituting $T_m$, as the steam temperature, into the formula (7) is the pipeline leakage transient pressure $P_m$ corresponding to the pipeline leakage transient steam temperature $T_m$;

in step 3, the process of positioning a leakage location by the PLC according to a pressure gradient method is specifically as follows:

firstly, a pressure gradient $$\frac{\partial P}{\partial x}|_U$$

upstream of a leakage point and a pressure gradient $$\frac{\partial P}{\partial x}|_D$$

downstream of the leakage point are calculated:

$$\frac{\partial P}{\partial x}|_U = \frac{P'_1 - P_m}{X} \quad (8)$$

$$\frac{\partial P}{\partial x}|_D = \frac{P_m - P'_2}{L + s - X} \quad (9)$$

wherein L is a distance from a pressure sensor within a region of the leakage point to a temperature sensor downstream thereof, and the unit is m; S is a distance from a temperature sensor within the region of the leakage point to a pressure sensor downstream thereof, and the unit is m; X is a distance from the location of the leakage point to a pressure sensor upstream within the region of the leakage point, and the unit is m; x represents a gradient direction; $\dot{P}_1$ is a pressure value detected by the pressure sensor upstream of the leakage point, and the unit is MPa; $\dot{P}_2$ is a pressure value detected by a pressure sensor downstream of the leakage point, and the unit is MPa; and $P_m$ is the pipeline leakage transient pressure, and the unit is MPa;

it is known from a formula for conservation of momentum within a steam pipeline:

$$\frac{\partial P}{\partial x}|_U = \frac{f\rho u^2}{2D} \quad (10)$$

$$\frac{\partial P}{\partial x}|_D = \frac{f\rho u^2}{2D}$$

wherein f is a friction coefficient; u is a flow velocity of steam, and the unit is m/s; ρ is a steam density, and the unit is kg/m³; D is a pipeline diameter, and the unit is m; the aperture of a leakage hole is less than the pipeline diameter and a pipeline length, and the variation of friction coefficients of two adjacent sides of the leakage hole within a short distance are ignored;

in the case of pipeline leakage, no phenomena of obvious free outflow and flow reduction of steam occur because of the presence of the thermal insulation layer (6), and therefore pressure gradients upstream and downstream of the leakage point are approximately the same, and after being stabilized, the pressures restore an original pressure distribution along the pipeline;

it can be obtained from simultaneous equations (8)-(10) that:

$$X = \frac{(L+s)(P'_1 - P_m)}{P'_1 - P'_2}$$

since the arrangement locations of the sensors are known, the location of the leakage point can be positioned accurately according to a calculated value X; and in step 3, in the process of positioning the location of the leakage point, a correction coefficient ξ is introduced, and the value X is corrected by a method of using temperatures to correct pressures, wherein the correction coefficient is represented by a formula below:

$$\xi = \frac{2T_m}{\dot{T}'_1 + \dot{T}'_2}$$

a corrected new value X is:

$$X = \frac{(L+s)(P'_1 - P_m)}{P'_1 - P'_2} \cdot \xi$$

wherein $T_m$ is the pipeline leakage transient steam temperature, and the unit is K; $\dot{T}_1$ is a temperature value detected by the temperature sensor upstream of the leakage point, and the unit is K; and $\dot{T}_2$ is a temperature value detected by the temperature sensor downstream of the leakage point, and the unit is K.

2. The pipeline potential safety hazard intelligent identification method integrating power frequencies, pressures and temperatures according to claim 1, wherein in step 4, the process of performing, by the PLC, a pipeline leakage early warning and an on-off early warning of a heating supply pump unit is specifically as follows:

the PLC collects data from the pressure sensors and the temperature sensors to form a pressure dataset and a temperature dataset for representing a pressure value distribution and a temperature value distribution along the pipeline at the same moment; sampling periods are set, so that the pressure value distribution of the same pressure sensor and the temperature value distribution of the same temperature sensor at intervals of one sampling period are formed; and at the same time, the PLC collects power frequencies of a heating supply pump through an Internet of Things (IoT) electricity meter to form a frequency dataset;

when any frequency value in the frequency dataset satisfies an on-off condition, which indicates that an on-off event occurs to the heating supply pump, the PLC outputs a device on-off signal to a device state register inside the PLC, but does not drive a field buzzer;

when a pressure leakage threshold value $\xi(P)$ preset by the PLC satisfies an early warning condition, the PLC outputs a pressure early warning signal to a pressure state register inside the PLC, if a monitoring system triggers the device on-off signal at the moment, the PLC automatically identifies a current working condition as a device on-off condition and no leakage;

and if the monitoring system does not trigger the device on-off signal at the moment, the PLC drives the buzzer to give a leakage alarm and then positions the leakage location according to the method described in step 3.

3. The pipeline potential safety hazard intelligent identification method integrating power frequencies, pressures and temperatures according to claim 2, wherein the early warning condition is $$\varepsilon(P) \geq 0.9 \left| \frac{P_i - P_m}{P_i} \right|,$$

wherein $$\varepsilon(P) = \left| \frac{P_i - P_i^{\Delta t}}{P_i} \right| \cdot P_m$$

is a pipeline leakage transient pressure, and the unit is MPa; $P_i^{\Delta t}$ represents a pressure value collected by the pressure sensor i at intervals of one sampling period $\Delta t$, and the unit is MPa; and $P_i$ represents a pressure value detected by the pressure sensor i, and the unit is MPa.

4. The pipeline potential safety hazard intelligent identification method integrating power frequencies, pressures and temperatures according to claim 2, wherein the on-off condition is that the frequency value is greater than 52 h or less than 48 h.

5. An identification system for implementing the pipeline potential safety hazard intelligent identification method integrating power frequencies, pressures and temperatures according to claim 1, comprising temperature sensors, pressure sensors, an IoT electricity meter, a PLC, an IoT DTU, a communication cable and a remote server, wherein the pressure sensors and the temperature sensors are arranged on a heating pipeline, and the IoT electricity meter is located in a device pump unit distribution box at the starting end of the heating pipeline and collects the frequency variation of a heating supply pump in real time; the PLC communicates with the temperature sensors, the pressure sensors, the IoT electricity meter and the IoT DTU, receives temperature values, pressure values and frequency values collected in real time, performs operation analysis, outputs early warning signals and positions a leakage point; and the IoT DTU is in signal connection with the remote server via a mobile network, and the remote server processes and stores all data of the monitoring system.

* * * * *